US010011959B2

(12) United States Patent
Klein

(10) Patent No.: US 10,011,959 B2
(45) Date of Patent: Jul. 3, 2018

(54) TIMBER ACCESS MAT WITH GROUNDING

(71) Applicant: Erik D. Klein, Uniontown, OH (US)

(72) Inventor: Erik D. Klein, Uniontown, OH (US)

(73) Assignee: EDK Innovations, LLC, Canton, OH (US)

( * ) Notice: Subject to any disclaimer, the term of this patent is extended or adjusted under 35 U.S.C. 154(b) by 98 days.

(21) Appl. No.: 15/280,478

(22) Filed: Sep. 29, 2016

(65) Prior Publication Data

US 2017/0114505 A1 Apr. 27, 2017

Related U.S. Application Data

(63) Continuation of application No. 14/936,489, filed on Nov. 9, 2015, now Pat. No. 9,458,578.

(60) Provisional application No. 62/077,014, filed on Nov. 7, 2014, provisional application No. 62/080,343, filed (Continued)

(51) Int. Cl.

| | |
|---|---|
| ***H02G 3/04*** | (2006.01) |
| ***E01C 9/08*** | (2006.01) |
| ***H01B 5/00*** | (2006.01) |
| ***H01R 4/66*** | (2006.01) |
| ***H01R 4/30*** | (2006.01) |
| ***E01C 5/16*** | (2006.01) |

(52) U.S. Cl.
CPC ................ *E01C 9/083* (2013.01); *E01C 5/16* (2013.01); *H01B 5/002* (2013.01); *H01R 4/30* (2013.01); *H01R 4/66* (2013.01); *E01C 2201/16* (2013.01)

(58) Field of Classification Search
CPC ........ E01C 9/083; E01C 5/16; E01C 2201/16; E01C 5/00; E01C 9/08; E01C 9/086; E01C 5/005; H01B 5/002; H01B 5/00; H01R 4/30; H01R 4/66; H01R 13/648; H01R 13/6485; H01R 13/65802; H01R 4/64; H01R 43/26; H02B 13/025
USPC .... 174/97, 6, 7, 5 R, 51, 5 SG; 439/100, 92, 439/95, 101
See application file for complete search history.

(56) References Cited

U.S. PATENT DOCUMENTS

| | | | |
|---|---|---|---|
| 4,967,057 | A | 10/1990 | Bayless et al. |
| 5,577,687 | A | 11/1996 | Downing |
| 5,653,551 | A | 8/1997 | Seaux |

(Continued)

FOREIGN PATENT DOCUMENTS

| | | | |
|---|---|---|---|
| CN | 87212162 | U | 7/1988 |
| CN | 688966 | A5 | 6/1998 |

(Continued)

OTHER PUBLICATIONS

Sep. 4, 2015 Sterling Press Release.

(Continued)

*Primary Examiner* — Angel R Estrada
(74) *Attorney, Agent, or Firm* — Zollinger & Burleson Ltd.

(57) ABSTRACT

A timber access mat having an electrical grounding feature includes an electrically conductive cover layer that is removably carried over the top of the body of the timber access mat. The electrically conductive cover layer can be formed from one or more sheets of expanded metal such as expanded steel. The layer is joined to a perimeter frame that includes offset connector tabs that allow mats to be positioned side-by-side. The connector tabs are paired with cable guides to protect the cable leads that connect the mats. The perimeter frame and conductive cover layer can be added to traditional timber access mats when electrical grounding is required and then removed and stored when not required.

21 Claims, 6 Drawing Sheets

Related U.S. Application Data on Nov. 16, 2014, provisional application No. 62/092,088, filed on Dec. 15, 2014.

(56) References Cited

U.S. PATENT DOCUMENTS

| | | | |
|---|---|---|---|
| 6,007,271 | A | 12/1999 | Cole et al. |
| 6,278,085 | B1 | 8/2001 | Abukasm |
| 6,477,027 | B1 | 11/2002 | McKelvy |
| 6,511,257 | B1 | 1/2003 | Seaux et al. |
| 6,888,081 | B2 | 5/2005 | Friedrich et al. |
| 7,370,452 | B2 | 5/2008 | Rogers |
| 7,404,690 | B2 | 7/2008 | Lukasik et al. |
| 7,413,374 | B2 | 8/2008 | Rogers et al. |
| 7,427,172 | B2 | 9/2008 | Lukasik |
| 7,604,431 | B2 | 10/2009 | Fournier |
| 7,645,962 | B2 | 1/2010 | Krossa et al. |
| 8,061,929 | B2 | 11/2011 | Dagesse |
| 8,382,393 | B1 | 2/2013 | Phillips |
| 8,414,217 | B2 | 4/2013 | Rosan |
| 8,511,257 | B2 | 8/2013 | Thibault |
| 8,545,127 | B2 | 10/2013 | Bleile et al. |
| 8,616,804 | B2 | 12/2013 | Corser |
| 8,902,559 | B2 | 12/2014 | Xu |
| 8,936,073 | B1 | 1/2015 | Phillips |
| 8,951,055 | B2 | 2/2015 | Eusterholz |
| 9,068,584 | B2 | 6/2015 | McDowell et al. |
| 9,212,746 | B2 | 12/2015 | McDowell |
| 9,337,586 | B2 | 5/2016 | McDowell et al. |
| 9,368,918 | B2 | 6/2016 | McDowell et al. |
| 9,450,126 | B1 | 9/2016 | Streett et al. |
| 9,458,578 | B2 | 10/2016 | Klein |
| 9,735,510 | B2 | 8/2017 | McDowell et al. |
| 2002/0178661 | A1 | 12/2002 | Burke et al. |
| 2004/0154908 | A1 | 8/2004 | Friedrich et al. |
| 2004/0253861 | A1 | 12/2004 | Schubert et al. |
| 2005/0239320 | A1 | 10/2005 | Folkema |
| 2005/0270175 | A1 | 12/2005 | Peddie et al. |
| 2007/0237581 | A1 | 10/2007 | Lukasik et al. |
| 2007/0258767 | A1 | 11/2007 | Tapp |
| 2008/0075533 | A1 | 3/2008 | Fournier |
| 2013/0051911 | A1 | 2/2013 | Corser |
| 2013/0264773 | A1 | 10/2013 | McDowell |
| 2013/0309008 | A1 | 11/2013 | Fournier |
| 2014/0189985 | A1 | 7/2014 | McDowell et al. |
| 2014/0193196 | A1 | 7/2014 | Fournier |
| 2014/0255108 | A1 | 9/2014 | McDowell |
| 2015/0029040 | A1 | 1/2015 | McDowell et al. |
| 2015/0099377 | A1 | 4/2015 | McDowell et al. |
| 2015/0101831 | A1 | 4/2015 | Dugas et al. |
| 2015/0266669 | A1 | 9/2015 | McDowell |
| 2016/0017547 | A1 | 1/2016 | Bordelon et al. |
| 2016/0017910 | A1 | 1/2016 | McDowell et al. |
| 2016/0032537 | A1 | 2/2016 | Edwards et al. |
| 2016/0076204 | A1 | 3/2016 | McDowell |
| 2016/0090806 | A1 | 3/2016 | Dugas et al. |
| 2016/0118747 | A1 | 4/2016 | McDowell et al. |
| 2016/0301161 | A1 | 10/2016 | McDowell et al. |
| 2016/0312490 | A1 | 10/2016 | McDowell et al. |
| 2016/0355995 | A1 | 12/2016 | Edwards et al. |
| 2016/0355996 | A1 | 12/2016 | Edwards et al. |
| 2017/0073904 | A1 | 3/2017 | McDowell et al. |

FOREIGN PATENT DOCUMENTS

| | | |
|---|---|---|
| EP | 1128713 | 8/2001 |
| WO | 2002072974 A1 | 9/2002 |

OTHER PUBLICATIONS

Sterling EquiPotential Matting; publication date unknown, access from http://www.sterlingcranemats.com/ Sep. 18, 2015.
Aug. 2013, Temporary Grounding for Lineworker Protection, How to Safely Install and Remove Personal Protective Grounds, Fifth Edition, Second printing Aug. 2013, Alexander Publications, see Appendix B, pp. 91-96.
Jan. 2010, Grounding for Lineworker Protection, Second Edition, First printing Jan. 2010, Alexander Publications, see Appendix B, pp. 85-89.
Sep. 2007, Live Line Work Practices, Second Edition, First printing: Sep. 2007, Alexander publications 2002, Chapters 10 and 11, see pp. 403-406, 436.
May 9, 2014, Document 5.32 Environmental Statement Project Description Appendices, Hinkley Point C Connection Project, Appendix 3G: Risk Assessments and Method Statements.
Copyright 2010, Kri-Tech Products Ltd, Portable Protective Bond Mat.
May 2017, photos 1 and 2 of EPZ zone from PAR Electric, used in USA prior to May 2017, dates of use unknown.
Jul. 23, 2012, photos 1 and 2 of grounding mats used by MJ Electric in USA.
Aug. 10, 2012, photos 1-4 of grounding mats used by MJ Electric in USA.
Dec. 2012, photos 1-9 of welded 4x8 steel conductive mats used by MJ Electric in Iowa, USA.
Jan. 17, 2012, Terrafirma, Electricity Alliance Sums up Dura-Base Mats . . . Security, Savings, and Service.
Aug. 2012, photos of conductive grid on Dura-Base Mats from Balfour Beatty Utility Services.
Summer 2015, Transmission Line, An M.J. Electric Publication, p. 4, Equipotential Zone (EPZ) Advancements.
Hastings grounding and Jumper Equipment, Grounding Mat, Jan. 2011, 1 pp.
The World's Latest Trackway, Copyright Liontrackhire 2015, http://www.liontrackhire.com/trackway/, 8 pp.
Standard (Orange) Equi-Mat Personal Protective Ground Grid, Hubbell Power Systems, Inc., http://www.hubbellpowersystems.com/lineman/grounding/ground-grids/ground-grid.asp, 2 pp.

TIMBER ACCESS MAT WITH GROUNDING

CROSS REFERENCE TO RELATED APPLICATIONS

This application is a continuation application claiming priority to U.S. patent application Ser. No. 14/936,489 filed Nov. 9, 2015, issued as U.S. Pat. No. 9,458,578 on Oct. 4, 2016, which claims the benefit of U.S. Provisional Patent Application Ser. Nos. 62/077,014 filed Nov. 7, 2014, 62/080,343 filed Nov. 16, 2014, and 62/092,088 filed Dec. 15, 2014; the disclosures of each are incorporated herein by reference.

BACKGROUND OF THE INVENTION

1. Field of Invention

This disclosure generally relates to timber access mats and, more particularly, to timber access mats with integrated grounding features. Specifically, the disclosure relates to grounding devices that can be added to and then removed from traditional timber access mats to allow the mats to be used when electrical grounding is necessary.

2. Description of Related Art

Timber access mats, which are also known as rig mats, rig pads and road mats, are used to provide support for vehicles on soft ground where paved roads are not present. Timber access mats reduce damage to softer ground and prevent motor vehicles from becoming stuck in the softer ground. Conventional mats are constructed as generally rectangular wood platforms formed by overlapping wooden beams in alternating directions. Three layers of typical 2×6 or 2×8 lumber can be used to form the mats. The body members also may be formed from polymer body members or other non-conducting materials. These mats work well when simply used to provide vehicle access and to protect the softer ground. These mats are used for high voltage line maintenance where the high voltage lines cut across the countryside. However, vehicles providing access to high voltage electrical wiring must be grounded. Grounding vehicles supported by timber access mats has created problems. There is also a problem with providing proper grounding to workers standing on the mats.

SUMMARY OF THE DISCLOSURE

The disclosure provides timber access mats with electrical conductors disposed at the support surface to provide electrical grounding to the mat.

The electrical conductors are provided in different forms. In one configuration, the conductors are parallel and disposed slightly above the upper surface of the body members of the mat. These parallel connectors are joined about the perimeter of the mat by a frame. Another configuration uses a mesh screen or web disposed over the top of the body members of the mat. The screen or web is connected to a frame or it can be wrapped around the edges of the mat. An optional filler such as a polymer or rubber may be disposed in the openings of the screen or web. The screen or web can be formed from flexible wires or a more rigid material such as sheets of expanded metal such as steel. Another configuration uses a thin sheet of conductive material disposed over the top of the body members of the mat. The thin sheet may be perforated or expanded to define openings. The sheet can be joined to the perimeter frame or its own perimeter frame.

The perimeter frame and metal conductive layer can be added over the top of traditional wooden-body or polymer-body timber access mats when electrical grounding is required and then removed and stored when grounding is not required.

The mats include electrical links that are used to electrically connect one mat to another such that each and every mat does not have to be individually pinned to the ground. This is beneficial when a platform is assembled from a plurality of mats. The electrical links can be wires such as steel cable leads. The steel cable leads can be located at each corner and across the width or length of the mat. A pair of leads can extend from each corner to connect other mats. Any of these cable leads can be pinned to the ground.

Another configuration of the timber access mat includes a frame configuration with electrical connector tabs that are offset on opposite sides of the mat frame so that a plurality of mats can be arranged in an abutting array to form a multiple mat platform. The opposed edges of each mat complement each other to allow the edges to abut without connector tabs interfering with each other.

The connector tabs allow electrical link cables to be attached from the top of the platform without requiring access to the bottom of the connector tab. This allows the mats to be connected and disconnected from above with a simple tool like a nut driver or a socket wrench.

Another configuration of the timber access mat includes cable guides disposed in tandem with the connector tab to manage the location of the grounding cable and/or the electrical link cable leads. The cable guides protect the cable from damage by preventing pinching between mats and preventing the cable leads from dropping down and being trapped under the mats.

The preceding non-limiting aspects, as well as others, are more particularly described below. A more complete understanding of the processes and the structures of the timber access mats can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
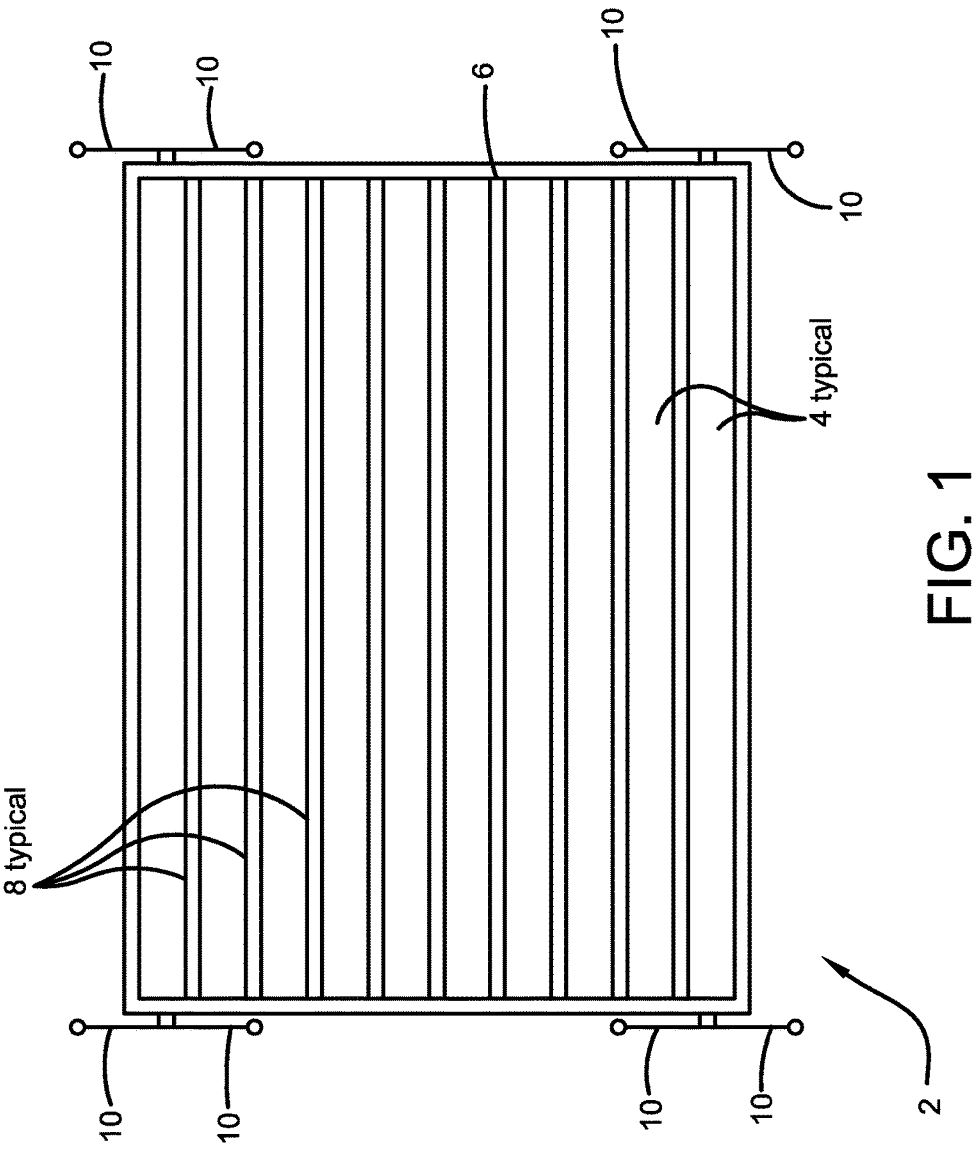
FIG. 1 depicts a top view of one configuration of the grounded timber access mat.
Figure 2:
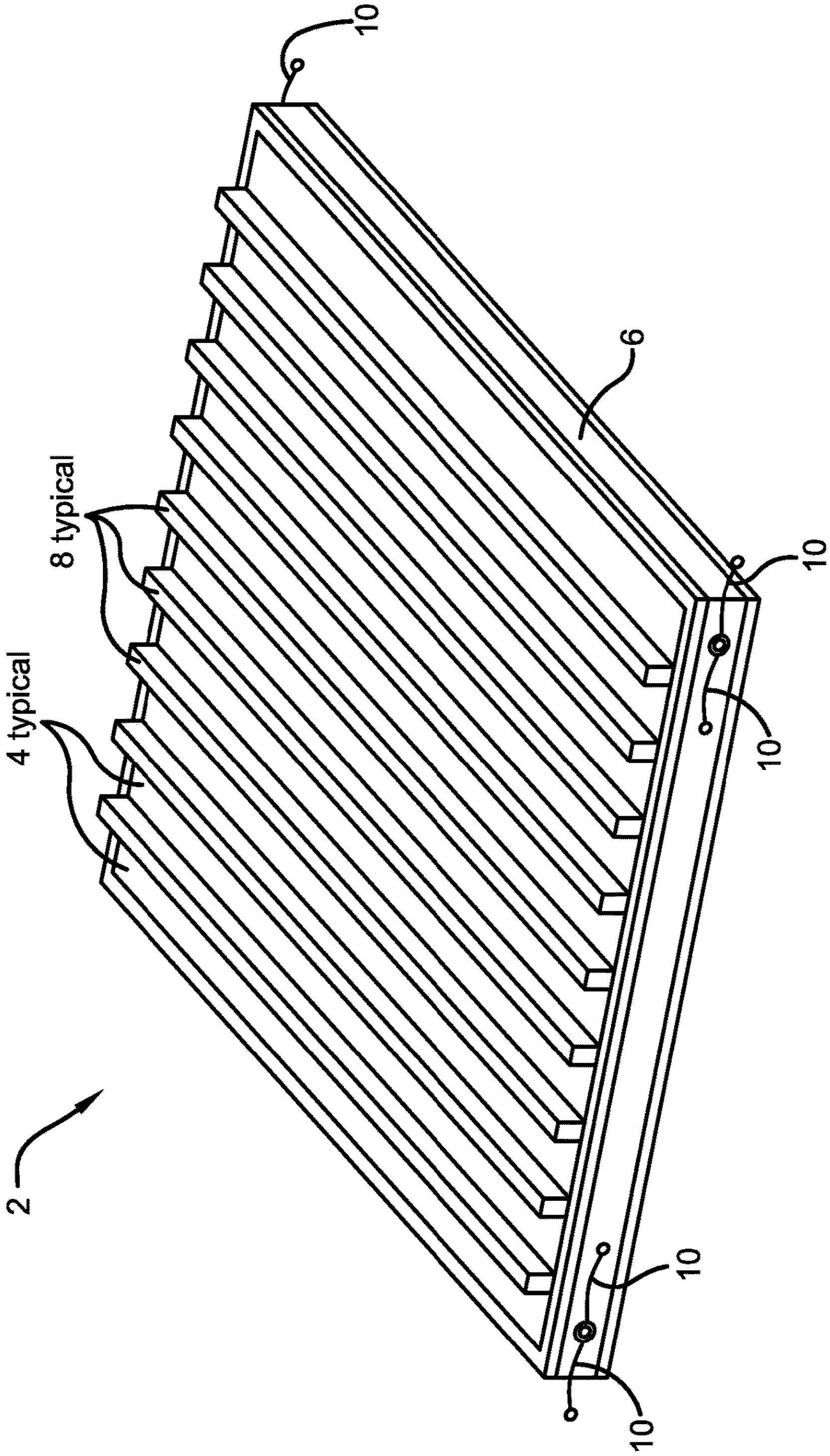
FIG. 2 is a perspective view of the FIG. 1 configuration.

In the configuration of FIGS. 1 and 2, a timber access mat 2 includes a plurality of non-conductive mat body members 4 disposed within a metal perimeter frame 6 disposed around the outside of the combined body members 4. Metal grounding slats 8 are disposed between or on top of body members 4. The ends of each metal grounding slat 8 are connected to perimeter frame 6. The ends can abut frame 6, rest on top of frame 6, or be disposed under frame 6. Each metal grounding slat 8 extends at least slightly above the upper surface of body members 4 so that a vehicle, a person, or other equipment supported by mat 2 will be in contact with at least one metal grounding slat 8. FIG. 2 depicts the raised nature of metal grounding slats 8 in an exaggerated manner. Each metal grounding slat 8 can extend about a quarter inch above the upper surface of body members 4. Slats 8 can be a quarter inch by a quarter inch metal strips disposed on top of body members 4. When body members 4 are traditional 2×4, 2×6, or 2×8 lumber, there can be multiple metal grounding slats 8 disposed on each body member 4. Limiting the distance between metal grounding slats 8 provides that a person or a vehicle will be in contact with at least one of metal grounding slats 8 when the person or vehicle is supported by timber access mat 2. A distance of four to six inches from edge to edge between adjacent metal grounding slats 8 is disclosed. Cross slats (not shown) can be used to increase the coverage of the conductive grounding members. The cross slats can be perpendicular to slats 8. Each of metal grounding slats 8 can be disposed one quarter of an inch above the upper surface of body members 4. Metal grounding slats 8 can be friction fit to frame 6, bolted or riveted to frame 6, or welded to frame 6.

An alternative configuration uses a filler material or a filler strip disposed between slats 8 to provide a flat surface to mat 2.

Flexible electrical cable leads 10 are connected to frame 6. Cable leads 10 can be located near the corners of frame 6. A pair or a plurality of cable leads 10 can extend from each location. Cable leads 10 are used to connect mats 2 or connect mat 2 to a grounding pin that is driven into the ground. Cable leads 10 can be bolted to frame 6 but also can be welded to frame 6. Each cable lead 10 can carry a bolt receiver at its loose end for receiving a bolt that is used to secure cable lead 10 to another mat 2 or to the grounding pin.

The mat configurations of FIGS. 3-6 are similar to the above configuration and the same reference numerals are used to identify similar elements. In place of slats 8, these mat configurations use a conductive cover layer 12 that is in the form of a mesh or conductive screen made of electrically conductive material such as steel. Another configuration uses a thin perforated metal foil as the conductive cover layer 12. One or a plurality of expanded metal sheets can be used over the body of the mat as conductive cover layer 12. An advantage to using the mesh, screen, or expanded metal is that the size of the gaps between conductive elements is small and a person standing on mat 2 is guaranteed to be in contact with multiple locations of layer 12. Conductive cover layer 12 can be bolted or welded to frame 6. Conductive cover layer 12 also can be wrapped around the sides of frame 6 and bolted to the sides or bottom of frame 6.

In the configurations using expanded metal sheets as conductive cover layer 12, each sheet of expanded metal can be lag bolted down into the body members of the mat with washers cooperating with the bolt heads to grip the expanded metal sheet. The lag bolts and washers allow the expanded metal layer 12 and frame 6 to be to and removed from the body members 4. This allows existing non-grounding timber access mats to be converted to grounding mats as needed. The edges of adjacent expanded metal sheets 12 are overlapped and either secured with bolts or welds or left loose. The expanded metal sheets 12 are welded or bolted to frame 6. An upper leg of frame 6 extends over an upper perimeter portion of the body with the edges of the expanded metal sheets disposed under the upper leg of frame 6. Another leg of frame 6 extends down the side of the body of the mat. The two legs cooperate to define an L-shaped cross section such that frame 6 sits over and surrounds the upper corners of the mat body. The upper leg of frame 6 is secured with connectors such as lag bolts directly down into the body members of the mat.

The grounding pin 18 is connected to frame 6 with a flexible cable 10. The flexible cable is connected at a raised U or C-shaped cleat that allows a tight bolted connection to be made between the flexible cable 10 and the frame 6. A plurality of flexible cables 10 can extend from a single cleat. The flexible cables 10 allow multiple mats to be electrically connected to a single grounding pin 18.

Figure 3:
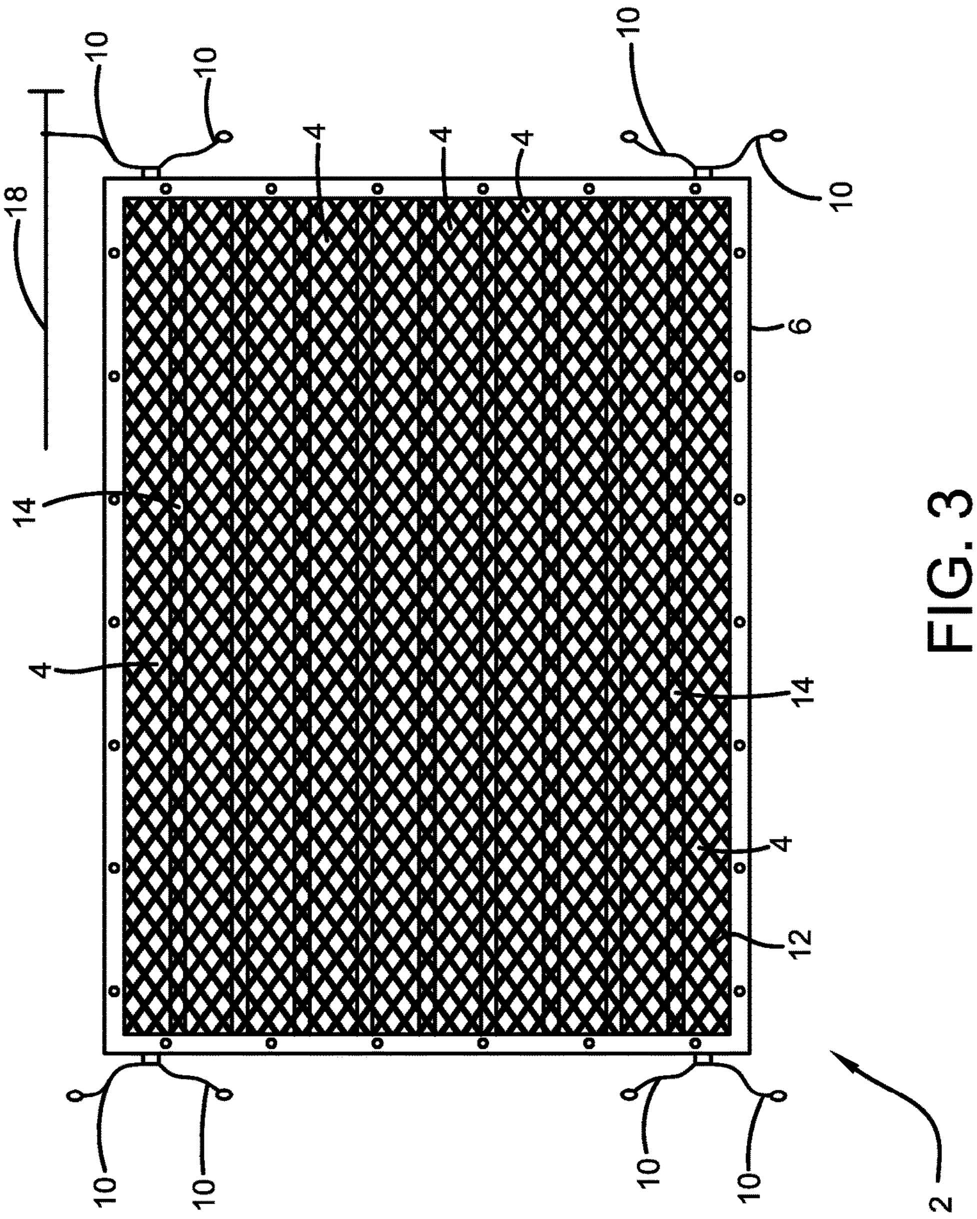
FIG. 3 is a top view of a second configuration the grounded timber access mat.

This configuration of FIG. 3 also discloses the use of flexible connectors 14 disposed under cover 12 and between body members 4 to directly connect the different locations where cable leads 10 are secured to frame 6 in order to provide for direct cabled electrical contact between these locations. Connectors 14 may be disposed between body members 4 and lower than the upper surface of body members 4. Connectors 14 can be directly connected to the inside of frame 6 or wrapped under the lower edge of frame 6 and connected to the cleats the receive cable leads 10.

A filler material can be used to fill the openings defined by the material of cover 12. The filler can be a rubber or polymer material that is sprayed onto the top of mat 2 in an amount thin enough to leave the upper surfaces of cover 12 exposed.

Figure 4:
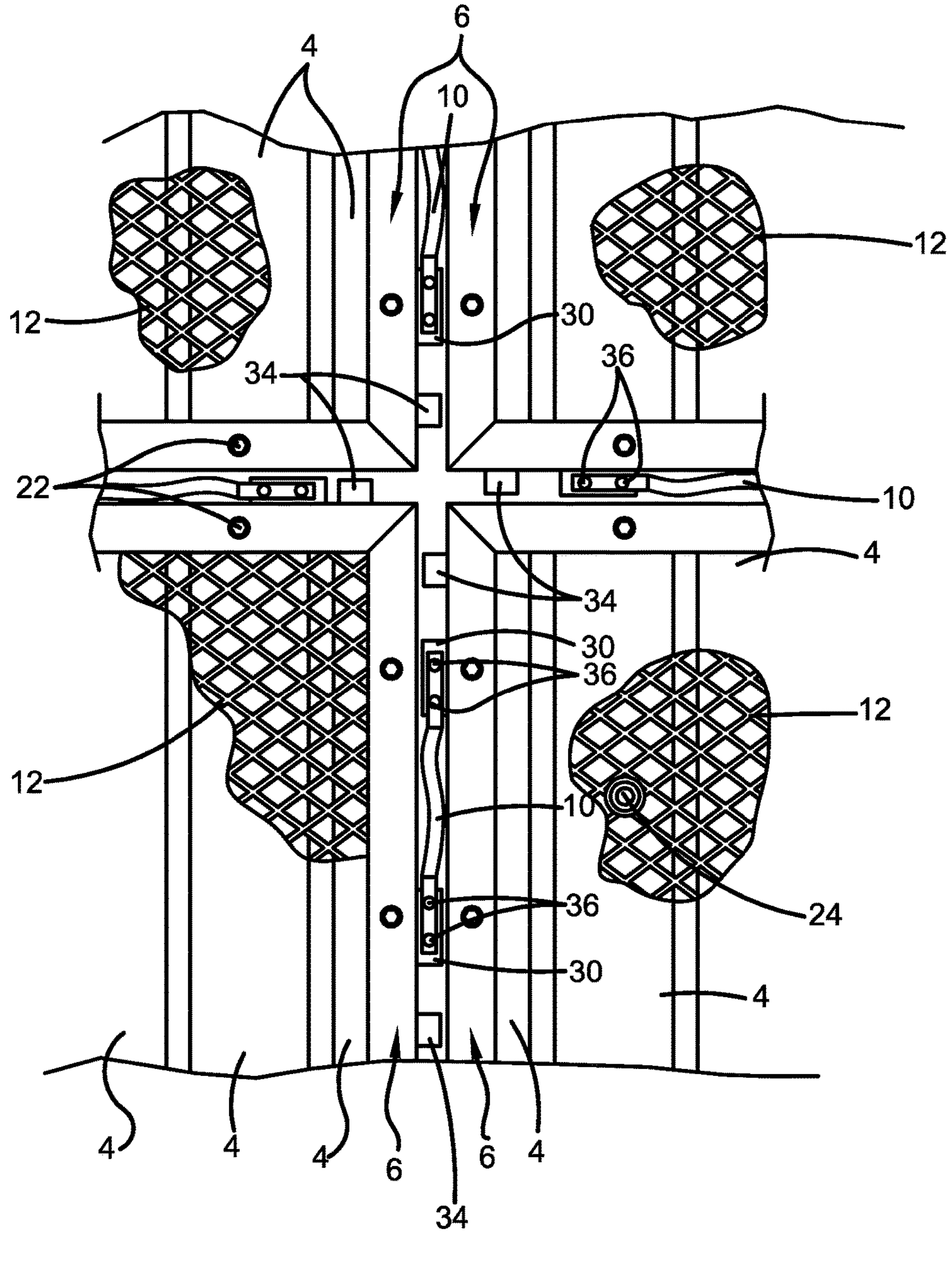
FIG. 4 is a top plan view of a four timber access mats arranged in an array.
Figure 5:
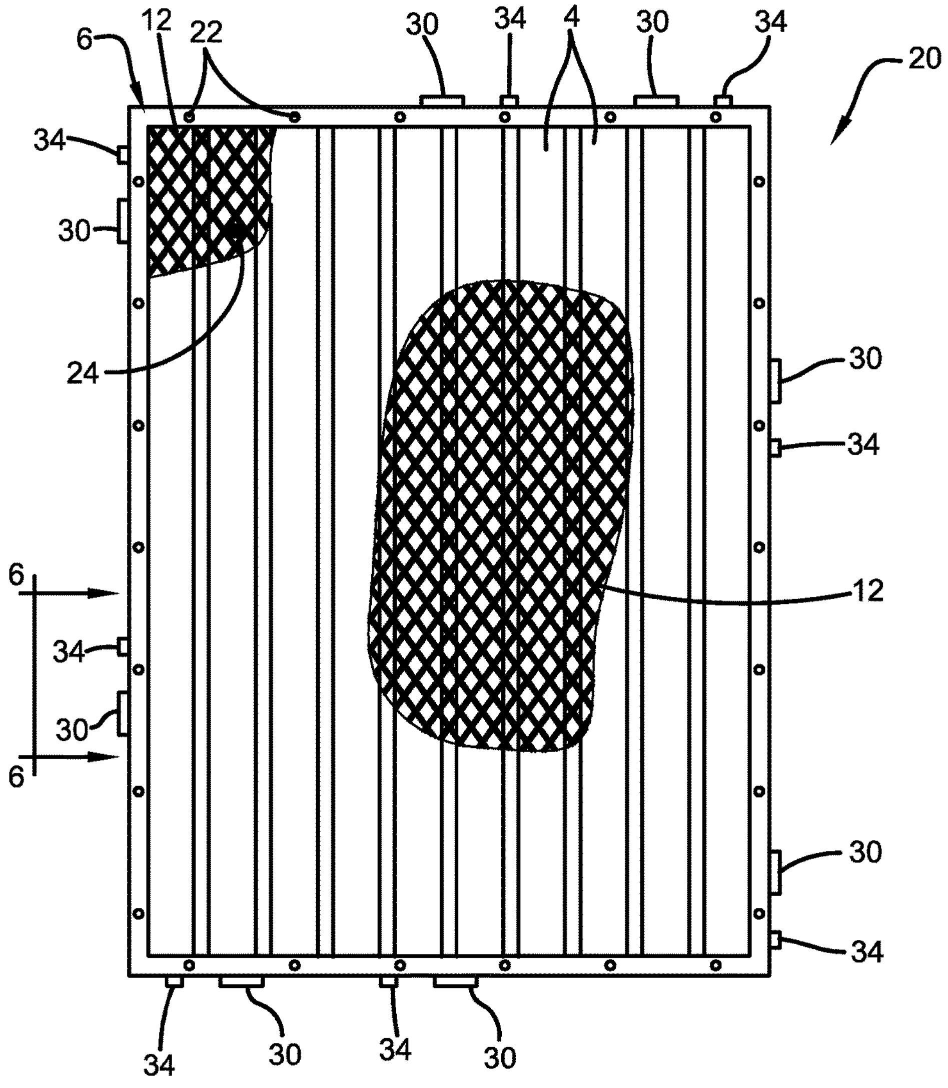
FIG. 5 is a top plan view of a single grounded timber access mat according to the third configuration.
Figure 6:
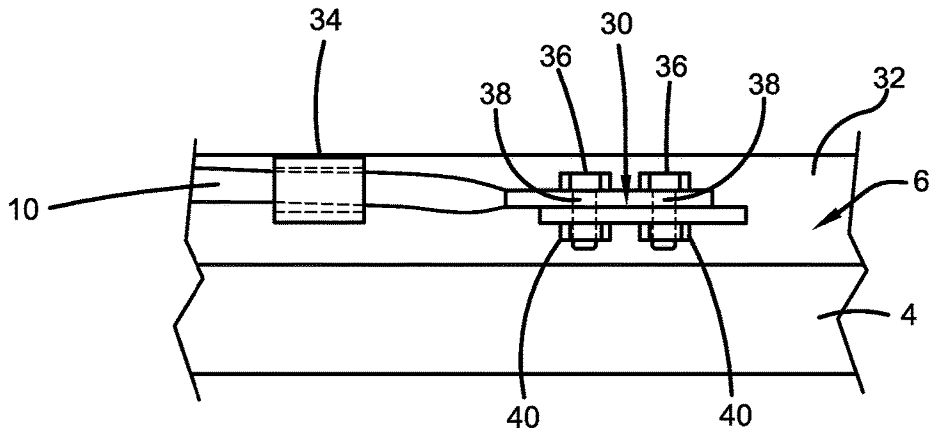
FIG. 6 is a side view taken along line 6-6 of FIG. 5.

In the configuration of FIGS. 4-6, a timber access mat 20 includes a plurality of body members 4 disposed within a metal perimeter frame 6. Frame 6 includes four upper, generally horizontal, frame members disposed over the outer upper perimeter portions of the timber access mat body. Frame 6 also includes vertical frame members extending down from the outer edges of the upper frame members such that they are disposed outwardly or against the outside edges of the timber access mat body. Conductive cover layer 12 such as a sheet or multiple sheets of expanded metal are disposed over the top of body members 4 with the perimeter edges of the expanded metal sheets disposed under the upper frame members of frame 6 as depicted in FIG. 4. The conductive cover layer 12 can be welded to frame 6. Also, bolts 22 may be used to secure the perimeter edge of conductive cover layer 12 to frame 6. In some configurations, bolts 22 do not extend into body members 4. In other configurations, bolts 22 are lag bolts that extend through frame 6, through conductive cover layer 12, and into body members 4 to removably secure the assembly together. Bolt and washer combinations 24 can be used to connect the expanded metal sheets to body members 4. The washers can be integrated with bolts or provided as separate articles. Bolts 22 and 24 can be removed to allow frame 6 and cover layer 12 to be removed from body members 4.

A plurality of connector tabs 30 extend from the vertical walls 32 of frame 6. Connector tabs 30 extend generally horizontal from vertical walls 32. Connector tabs 30 can be formed by welding or securing with mechanical connectors L-shaped lengths of metal to the outer side surfaces of frame 6. Connector tabs 30 are arranged in complementary positions on opposite walls of frame 6 such that mats 20 can be arranged side-by-side without connector tabs 30 interfering with each other. FIG. 5 shows how connector tabs 30 are offset so they interlock and FIG. 4 depicts how these positions complement each other. Connector tabs 30 may directly abut the other frame 6 or cable guides 34 may directly abut the other frame or both can be the same width and function to space the adjacent frame members and prevent the crushing of cable leads 10. Each cable guide 34 is a loop sized to receive cable leads 10. Threading cable leads 10 through cable guide 34 helps prevent cable lead 10 from being pinched between adjacent mats 20 and prevents cable from falling down below the mats. In this configuration, each cable lead 10 is secured to connector tab 30 with a pair of bolts 36 that position the end of cable lead 10 parallel (and substantially horizontal) to the wall of frame 6 from which connector tab 30 extends. This keeps the ends of cable leads 10 out of the way when mats 20 are disposed edge-to-edge. Each connector tab can define space for multiple cable lead ends. Bolts 36 can be threaded into threaded openings 38 (FIG. 6) or into threaded nuts (optional) 40 welded to the bottom of connector tab 30. This configuration allows bolts 36 to be secured when mats 20 are disposed edge-to-edge as shown in FIG. 4. Cable leads 10 are used to electrically connect mats 20. Cable leads 10 also are used to connect a grounding pin to mat 20.

The metal frame 6 and conductive cover layer 12 can be galvanized.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the claimed invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. An electrically-grounded work platform capable of supporting the weight of personnel, vehicles, and equipment thereupon on uneven ground; the work platform comprising:

a plurality of timber access mats disposed next to each other on the uneven ground;

each of the timber access mats including a wooden mat body having an upper perimeter edge; a metal frame disposed around the upper perimeter edge of the wooden mat body; and a conductive cover layer connected to the metal frame and disposed over and against the wooden mat body such that the conductive cover layer and wooden mat body are configured to support the weight of personnel, vehicles, and equipment thereupon;

each of the metal frames and conductive covers being removably and re-usably connected to the wooden mat body of the timber access mat such that each of the metal frames and conductive covers can be removed from the wooden mat body and reused;

each metal frame having an upper surface;

each of the timber access mats being connected to at least another of the timber access mats with a flexible electrical connector; each flexible electrical connector being connected to the metal frame below the upper surface of the metal frame to which it is connected; and a grounding pin electrically connected to at least one of the frames and disposed in the ground.

2. The work platform of claim 1, wherein each of the conductive cover layers is expanded steel.

3. The work platform of claim 1, wherein each of the metal frames has a first substantially horizontal upper frame member and a second substantially vertical frame member; and the vertical frame member being disposed along sides of the wooden mat body.

4. The work platform of claim 3, wherein each of the metal frames further includes a metal connector tab extending outwardly from the second substantially vertical frame member.

5. The work platform of claim 4, wherein each flexible electrical connector is connected to two of the metal connector tabs; each flexible electrical connector having ends disposed parallel to the portion of the frame from which the connector tab extends.

6. The work platform of claim 4, wherein each flexible electrical connector has ends disposed on top of the connector tabs; the ends of the flexible electrical connector being disposed below the upper surface of the frame.

7. The work platform of claim 6, wherein the ends of each flexible electrical connector are connected to the connector tabs with a threaded connectors.

8. The work platform of claim 7, wherein each connector tab defines a threaded opening that receives the threaded connector.

9. The work platform of claim 8, wherein a threaded nut is connected to each connector tab and receives the threaded connector.

10. The work platform of claim 4, wherein each of the ends of the flexible electrical connector are connected to the connector tabs with a pair of spaced bolts.

11. The work platform of claim 1, wherein the conductive cover layer is connected to the wooden mat body with connectors and the connectors include lag bolts that extend into the wooden mat body.

12. The work platform of claim 11 wherein outer edges of the conductive cover layer are disposed under the metal frame.

13. The work platform of claim 12, wherein the connectors include lag bolts that extend through the metal frame, through the conductive cover layer, and into the wooden mat body.

14. The work platform of claim 1, wherein each flexible electrical connector has ends; each end being disposed parallel to the portion of the frame to which the end is connected.

15. The work platform of claim 1, wherein each flexible electrical connector has ends; each end of the flexible electrical cable being connected to the connector tab with a pair of spaced bolts.

16. An electrically-grounded work platform capable of supporting the weight of personnel, vehicles, and equipment thereupon on uneven ground; the work platform comprising: a plurality of timber access mats disposed next to each other on the uneven ground; each of the timber access mats including a wooden mat body having an upper perimeter edge; a metal frame disposed around the upper perimeter edge of the wooden mat body; and an expanded steel conductive cover layer connected to the metal frame and disposed over and against the wooden mat body such that the conductive cover layer and wooden mat body are configured to support the weight of personnel, vehicles, and equipment thereupon; each of the metal frames and conductive covers being removably and re-usably connected to the wooden mat body of the timber access mat such that each of the metal frames and conductive covers can be removed from the wooden mat body and reused; each of the metal frames having a first substantially horizontal upper frame member and a second substantially vertical frame member; and the vertical frame member being disposed along sides of the wooden mat body; each metal frame having an upper surface; each of the timber access mats being connected to at least another of the timber access mats with a flexible electrical connector; each flexible electrical connector being connected to the vertical frame member below the upper surface of the metal frame to which it is connected; and a grounding pin electrically connected to at least one of the frames and disposed in the ground.

17. The work platform of claim 16, wherein each of the metal frames further includes a metal connector tab extending outwardly from the second substantially vertical frame member.

18. The work platform of claim 17, wherein each flexible electrical connector is connected to two of the metal connector tabs; each flexible electrical connector having ends disposed parallel to the portion of the frame from which the connector tab extends.

19. The work platform of claim 16, wherein the conductive cover layer is connected to the wooden mat body with connectors and the connectors include lag bolts that extend into the wooden mat body.

20. The work platform of claim 19, wherein outer edges of the conductive cover layer are disposed under the metal frame.

21. The work platform of claim 20, wherein the connectors include lag bolts that extend through the metal frame, through the conductive cover layer, and into the wooden mat body.

* * * * *